United States Patent [19]

Kuhns

[11] Patent Number: 4,717,308
[45] Date of Patent: Jan. 5, 1988

[54] CONTAINER UNLOADING SYSTEM
[75] Inventor: Abe B. Kuhns, Arthur, Ill.
[73] Assignee: E-Z Trail, Inc., Arthur, Ill.
[21] Appl. No.: 561,308
[22] Filed: Dec. 14, 1983
[51] Int. Cl.[4] .............................................. B60P 1/42
[52] U.S. Cl. .................................... 414/307; 414/323;
414/326; 414/503; 414/526; 414/310
[58] Field of Search ............... 414/306, 307, 323, 325, 414/326, 503, 523, 526, 315, 310; 91/520

[56] References Cited
U.S. PATENT DOCUMENTS

| | | | |
|---|---|---|---|
| 3,173,563 | 3/1965 | Finch | 414/502 |
| 3,237,788 | 3/1966 | Weaver et al. | 414/307 |
| 3,325,028 | 6/1967 | Kenning | 414/503 |
| 3,391,809 | 7/1968 | Weaver et al. | 414/307 X |
| 3,499,556 | 3/1970 | Broberg | 414/307 |
| 3,511,399 | 5/1970 | Sammarco | 414/503 |
| 3,520,434 | 7/1970 | Destefan et al. | 414/502 |
| 3,613,926 | 10/1971 | Scroggins | 414/503 |
| 3,817,409 | 6/1974 | Weaver | 414/307 |
| 3,830,383 | 8/1974 | Skippon et al. | 414/323 |
| 4,258,886 | 3/1981 | Lundahl et al. | 91/520 X |

OTHER PUBLICATIONS

Brochure-Farmhand Single Auger Box.
Brochure: Gehl Models 610, 620 and 910 Container Unloaders.

Primary Examiner—Robert J. Spar
Assistant Examiner—Stuart J. Millman
Attorney, Agent, or Firm—Lockwood, Alex, FitzGibbon & Cummings

[57] ABSTRACT

An unloading system for a container, such a forage box, includes a floor and a pair of parallel sidewalls. An auger is located in the container and a hydraulic motor on the auger rotates the auger to convey material in the container toward one end thereof. The auger is mounted on movable carriages and a second hydraulic motor drives the carriages to advance the auger transversely across the floor of the container between the sidewalls while the auger is rotating. A second cross auger is positioned adjacent the discharge end of the aforementioned auger and extends transversely of the container to receive the material conveyed by the first auger and discharge it from the container, and the second auger is also driven by a hydraulic motor. The hydraulic motor which transversely advances the first auger includes a relief valve which controls the hydraulic fluid pressure of that motor to vary the speed of the transverse movement across the floor of the container.

16 Claims, 6 Drawing Figures

CONTAINER UNLOADING SYSTEM

BACKGROUND AND SUMMARY OF THE INVENTION

The present invention relates to a container unloading system and, more particularly, to an unloading system for a container containing materials, such as forage, wood chips, corn and the like Various unloading systems have been employed in either stationary or movable containers for such materials, and particularly, for forage.

One such prior unloading system employs a plurality of beaters which rotate in the container to loosen the forage. The forage is moved forward in the container by feed chain conveyors on the floor thereto. At the forward end of the forage box or container, the beaters loosen the forage and a cross chain conveyor discharges it transversely from the forage box or container.

The aforementioned unloading system has several important disadvantages. One disadvantage is that the beaters and the mechanical drive mechanism therefor are extremely complex and the beaters themselves are very dangerous. Another disadvantage is in the chain conveyors which are employed in the aforementioned unloading systems. If one of the conveyors breaks, its links will become mixed with the forage and can quite possibly result in the death of the animals consuming the forage. Still another disadvantage of the aforementioned unloading system is that it cannot be easily installed on preexisting forage boxes or feed bins.

In U.S. Pat. No. 3,325,028 an unloading system is disclosed which has the express purpose of overcoming some of the last mentioned disadvantages of the system employing beaters. In that Letters Patent a forage box unloading system is disclosed in which the beaters have been eliminated and an auger is mounted to rotate and advance transversely across the floor of the forage box to convey forage toward one end of the box. At that end of the box a chain conveyor is positioned to receive the forage from the auger and discharge the forage from the box.

Although the unloading system disclosed in the aforementioned Letters Patent overcomes one or more of the disadvantages of the prior unloading system employing beaters, it still suffers several important disadvantages. One disadvantage is that the mechanical drive mechanisms needed to drive the auger both in rotation and transversely across the floor of the forage box, and also to drive the cross conveyor, are extremely complex. Such drive mechanisms include an elaborate set of jack knifing arms which are not only complex, but are dangerous to personnel operating the system. Moreover, the chain cross conveyor is subject to clogging and also to the aforementioned disadvantage of the possibility of links getting into the silage if the chain breaks. Still other disadvantages of the complex mechanically operated unloading system disclosed in the Letters Patent is that it is extremely noisy, is subject to extensive maintenance requirements, is heavy and space consuming, and is dangerous due not only to the presence of the jack knifing arms, but also because of the numerous chain drives and other moving parts which are necessary to drive the mechanically driven system.

An unloading system incorporating the principles of the present invention overcomes substantially all of these several aforementioned disadvantages of both prior unloading systems. The unloading system incorporating the principles of the present invention may be used either in a stationary container or in a mobile container for containing materials such as forage, wood chips, corn cobs and the like. An unloading system incorporating the principles of the present invention does not include beaters as in the prior unloading system and, therefore, is substantially simpler and safer. An unloading system incorporating the principles of the present invention may employ augers instead of chain conveyors for conveying the materials in the container and, thereby, eliminates the danger of the presence of broken links in the forage. An unloading system incorporating the principles of the present invention can be readily installed on existing forage boxes or feed containers. An important advantage of an unloading system incorporating the principles of the present invention is that the presence of complex moving mechanical parts is substantially reduced and jack knifing arms and extensive chain drives may be eliminated, thereby reducing weight and space requirements, its noise level during operation, its maintenance requirements, and hazardous personnel conditions. Moreover, the augers which are preferably employed in an unloading system incorporating the principles of the present invention are not as susceptible to clogging as are the chain conveyors employed in the prior systems. In an unloading system incorporating the principles of the present invention, power takeoff units may also be eliminated and many, if not all, of the moving parts of the system may be enclosed within the container or within suitable enclosures to prevent damage to the parts themselves and injury to personnel. In an unloading system incorporating the principles of the present invention, an auger moves the material in the container, the auger advances transversely of the container, and the resistance to this transverse movement may be sensed to vary the speed of the transverse movement depending upon the amount and kind of material in the container.

In one principal aspect of the present invention, an unloading system for a container having a floor and a pair of substantially parallel sidewalls comprises an auger which is rotatable about an axis and extends in a direction substantially parallel to the sidewalls of the container. A fluid motor on the auger rotates the auger about the axis to convey material in the container toward one end of the auger. Mounting means mounts the auger to advance transversely across the floor of the container between the sidewalls and in a direction substantially perpendicular to the sidewalls. Drive means drives the mounting means to advance the auger transversely back and forth across the floor while the auger is rotating and resistance sensing means senses the resistance to the transverse movement of the auger by the material in the container to vary the speed of the transverse movement of the auger across the floor of the container.

In another principal aspect of the present invention, the aforementioned drive means for transversely driving the auger across the floor of the container also comprises a second fluid motor.

In still another principal aspect of the present invention, the aforementioned resistance sensing means includes relief means for controlling the fluid pressure in the last mentioned fluid motor.

In still another principal aspect of the present invention, the aforementioned mounting means comprises track means extending transversely of the container and carriage means which is movable along the track, and an end of the auger is rotatably mounted on the carriage means.

In still another principal aspect of the present invention, conveyor means in the container also extend transversely of the container and are positioned adjacent one end of the auger to receive the material conveyed by the auger.

In still another principal aspect of the invention, all of the drives in the aforementioned systems are fluid motors.

These and other objects, features and advantages of the present invention will be clearly understood through a consideration of the following detailed description.

BRIEF DESCRIPTION OF THE DRAWINGS

In the course of this description, reference will frequently be made to the attached drawings in which:

FIG. 3 is a partially broken away, cross-sectioned, frontal end elevation view of the forage box, as viewed substantially along line 3—3 of FIG. 2;

FIG. 4 is a partially broken away, cross-sectioned side elevation view of the forage box, as viewed substantially along line 4—4 of FIG. 2;

DESCRIPTION OF THE PREFERRED EMBODIMENT

Figure 1:
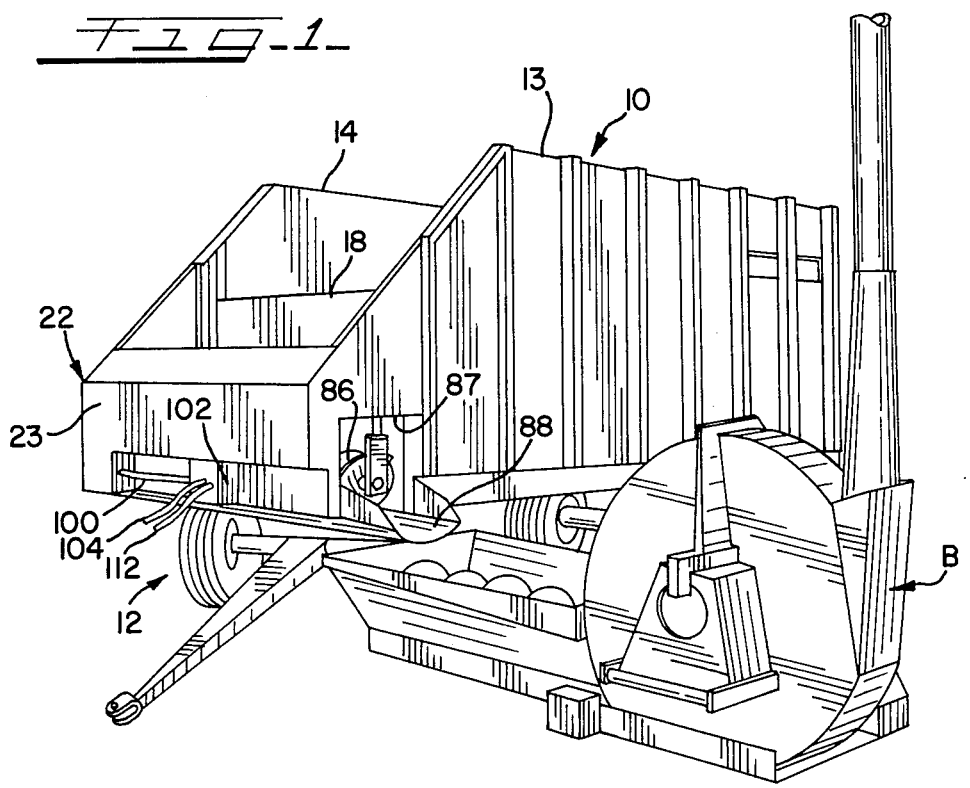
FIG. 1 is an overall perspective view of a forage box incorporating a preferred embodiment of unloading system in accordance with the principles of the present invention, and a blower for receiving the discharge from the forage box.

As shown in FIG. 1, an unloading system incorporating the principles of the present invention may be incorporated into a container, such as a forage box 10 which may be transported from place to place on a wheeled chassis 12. In the alternative, the unloading system may be employed in a stationary container, such as a feed box or the like. The container may be used for forage as well as wood chips, corn, etc.

Figure 2:
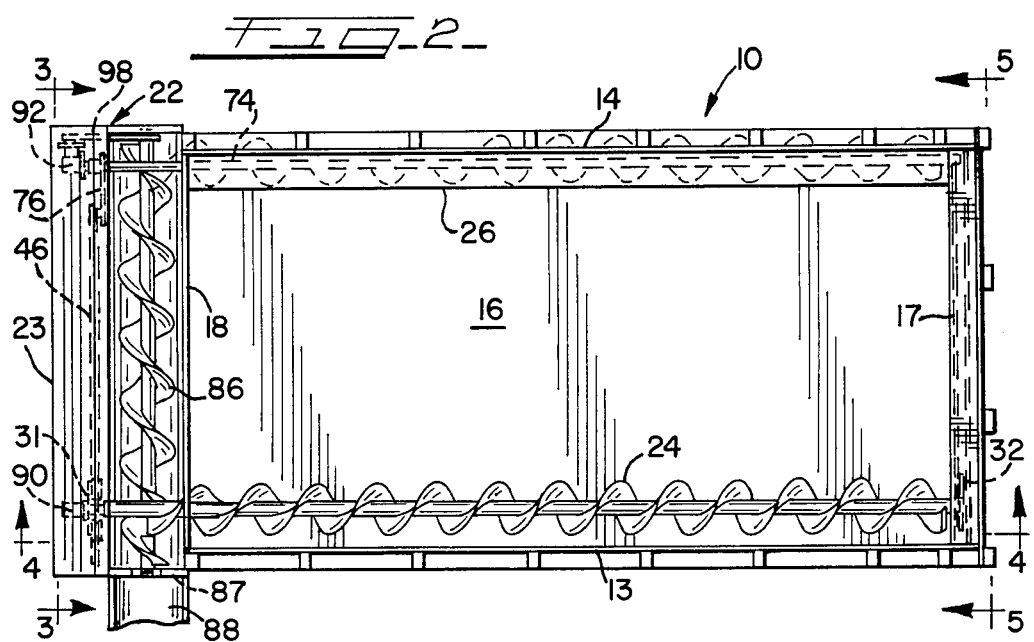
FIG. 2 is a plan view of the forage box as shown in FIG. 1.
Figures 3, 4:
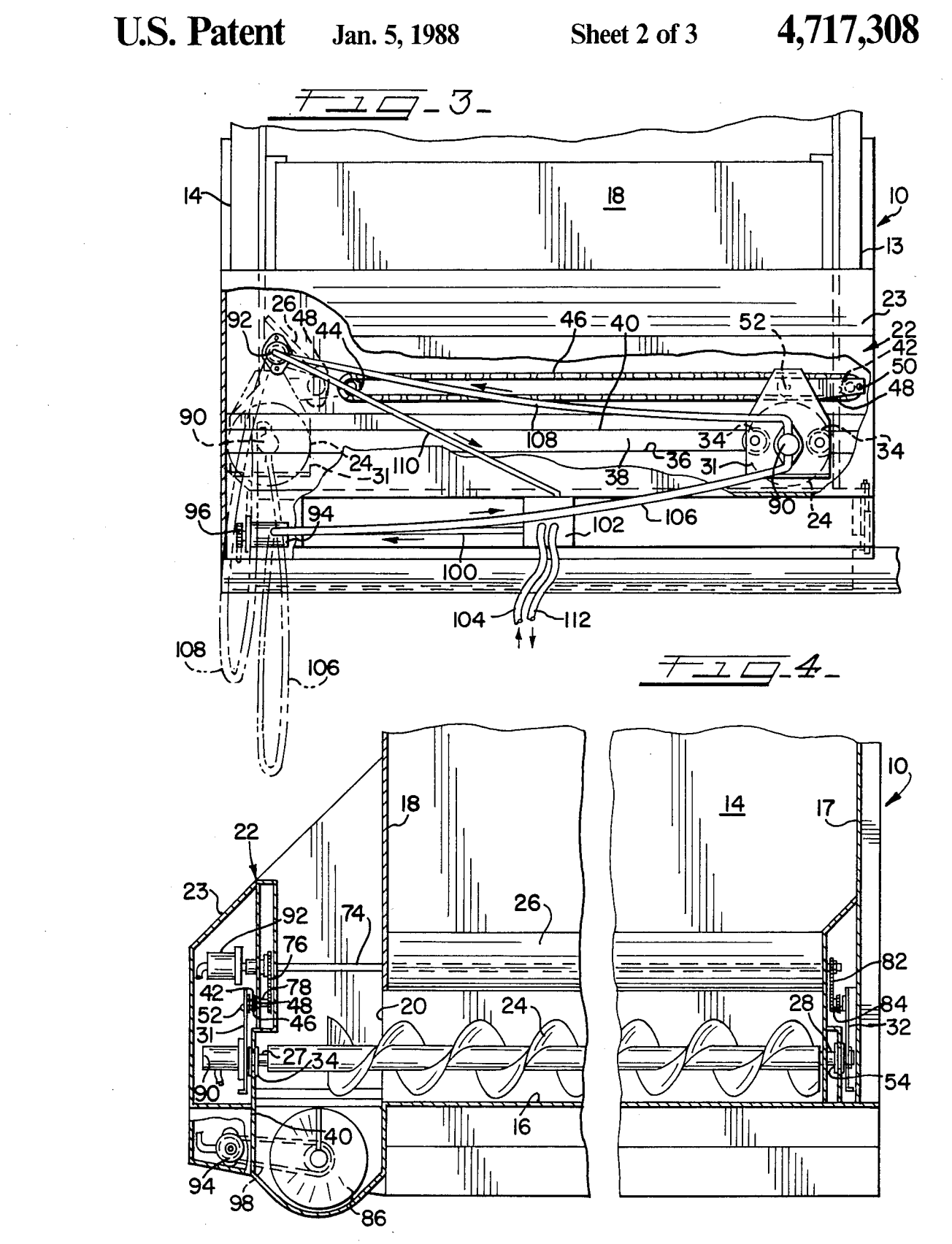
Figure 5:
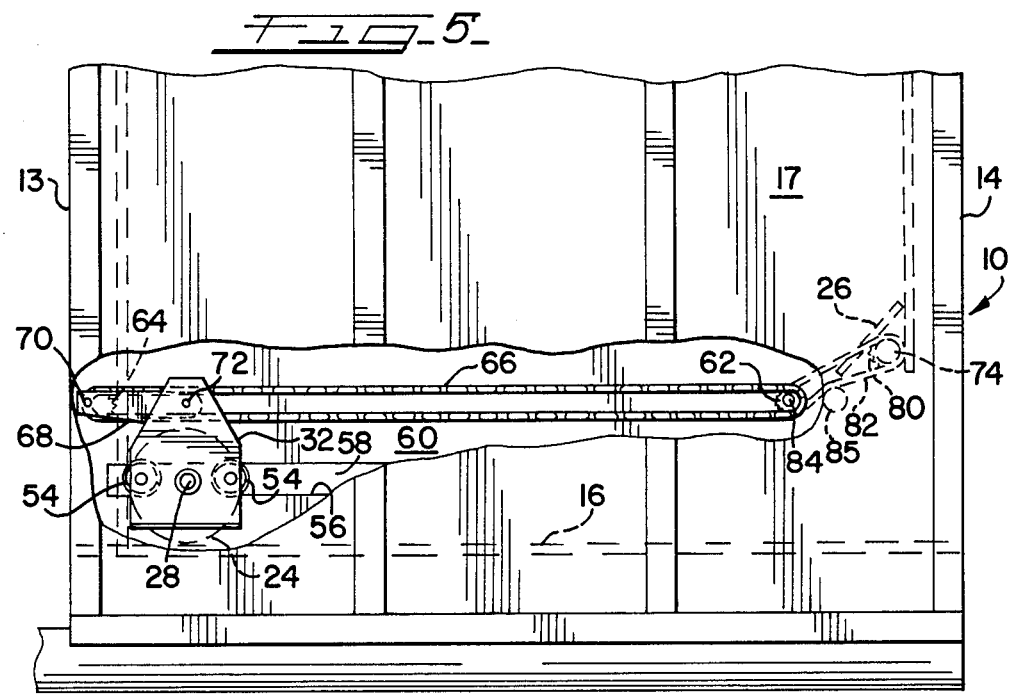
FIG. 5 is a partially broken away, rear elevation view of of the forage box as viewed substantially along line 5—5 of FIG. 2.

The forage box 10 preferably comprises a pair of longitudinally extending, parallel sidewalls 13 and 14, a generally flat bottom wall 16, as best seen in FIGS. 2 and 4, a rear wall 17, as best seen in FIGS. 2, 4 and 5, and a front wall 18, the latter of which terminates before the floor 16 to define a rectangular opening 20, as best seen in FIG. 4, adjacent the front of the forage box. A housing 22 is also mounted at the front wall of the forage box 10 to contain the drive system for the several moving components which will be described in more detail to follow. The housing 22 also preferably includes a hinged cover 23 which is preferably closed during operation of the system for protection of personnel, but which may be opened to provide for access to the components therein. For purposes of the present discussion the housing 22 is also considered to be part of the container or forage box 10.

As best seen in FIGS. 2 and 4, an elongate conveyor extends over the length of the forage box 10 just above its floor. The conveyor preferably takes the form of an elongate auger 24. Auger 24 rotates during operation and also advances transversely back and forth across the floor 16 of the forage box from an initial starting position underneath an inclined cover 26, as shown in dot and dash in FIG. 2, to the solid position shown in FIG. 2, and back to the dot and dash position. The cover 26 is stationarily mounted to one of the sidewalls, for example sidewall 14, as shown in FIGS. 2 and 4, and prevents the materials in the container or forage box from resting upon the auger when the auger is positioned beneath the cover and when it is to be initially started. The weight of such materials upon startup might cause the auger to bind if the weight is excessive.

The auger 24 is rotatably mounted at each end by rotatable shafts 27 and 28, as best seen in FIG. 4, which extend into suitable bearings (not shown) in front and rear movable carriages 31 and 32, respectively. The purpose of the carriages is to effect transverse advancement of the auger 24 back and forth across the floor 16. Front carriage 31 includes a pair of guide rollers 34, as best seen in FIGS. 3 and 4, which ride on a track 36 defined by an elongate slot 38 in a rigid partition 40 in the housing 22. As shown in FIG. 3, a pair of sprockets 42 and 44 are also rotatably mounted on the partition 40 and an endless chain 46 is mounted upon the sprockets. A connector arm 48 has one of its ends pivotally pinned by a pin 50 to a link on the chain 46 and its other end is pivotally pinned by a pin 52 to the carriage 31. Thereby, as the chain 46 is caused to rotate about the sprockets 42 and 44, the connector arm 48 will move transversely across the forage box to advance the carriage 31 and its end of the auger transversely across the floor 16 of the forage box.

The carriage 32 at the rear of the forage box is substantially the same as the carriage 31 just described. Carriage 32 also includes a pair of rollers 54, as best seen in FIG. 5, which roll in a track 56 defined by the slot 58 in a partition 60. Also mounted on the partition 60 are a pair of sprockets 62 and 64 about which an endless chain 66 is carried as in the forward advancing assembly. Also as in the forward advancing assembly, a connector arm 68 is provided which is pinned at one end by a pin 70 to a link of the endless chain 66, and at its other end by a pin 72 to the rear carriage 32.

An elongate drive shaft 74, as best seen in FIGS. 2 and 4, extends the length of the forage box. At the forward end of the forage box the drive shaft includes a sprocket (not shown), and a drive chain 76, again as best seen in FIGS. 2 and 4, drives a shaft 78. The shaft 78, in turn, is mounted to the sprocket 44 to drive the sprocket and endless chain 46. A sprocket 80, as best seen in FIG. 5, is also mounted at the rear end of drive shaft 74. Sprocket 80 drives a chain 82 which is trained about a sprocket (not shown), the latter of which drives a drive shaft 84 which, in turn, drives sprocket 62 and chain 66. Thus, it will be seen that rotation of drive shaft 74 will cause the forward advance chain 46 and rear advance chain 66 to be driven in unison along with their respective carriages 31 and 32. Idler sprockets, such as sprocket 85 shown in FIG. 5, may be provided to adjust the tension of chains 76 and 82.

In addition to the longitudinally extending auger 24, a second conveyor is also provided at the forward end of the forage box to receive the materials discharged from the auger 24. This forward cross conveyor preferably also comprises an auger 86 which rotates in a direction to force material toward an opening 87 and discharge chute 88 in the side of the forage box. The cross auger 86 is preferably mounted at each end in bearings (not shown) to allow rotation of the cross auger.

The materials discharged from the chute 88 may be received by equipment, such as the blower B shown in FIG. 1, to store the forage in a silo. The blower B does not form a part of the invention and, therefore, will not be described in detail.

In the preferred embodiment of the present invention three fluid motors, preferably hydraulic, are provided to separately and independently drive the aforementioned mechanisms. As best seen in FIGS. 2-4, one hydraulic motor 90 is mounted upon the forward carriage 31 and directly rotates shaft 27 and auger 24. The second transverse advance hydraulic motor 92 is mounted to the forward end of the drive shaft 74 to rotate the drive shaft 74 and cause the auger 24 to advance transversely of the forage box. This transverse advance drive motor 92 rotates the drive shaft 74, rotating chains 76 and 82 at the forward and rear ends of the forage box, respectively, to drive the chains 46 and 66 and their respective carriages 31 and 32. The third cross auger hydraulic drive motor 94 drives a sprocket 96, as best seen in FIG. 3, which drives a drive chain 98, as best seen in FIGS. 2 and 4. The drive chain 98, in turn, drives a sprocket (not shown) on the shaft of the cross auger 86 to rotate the cross auger.

Figure 6:
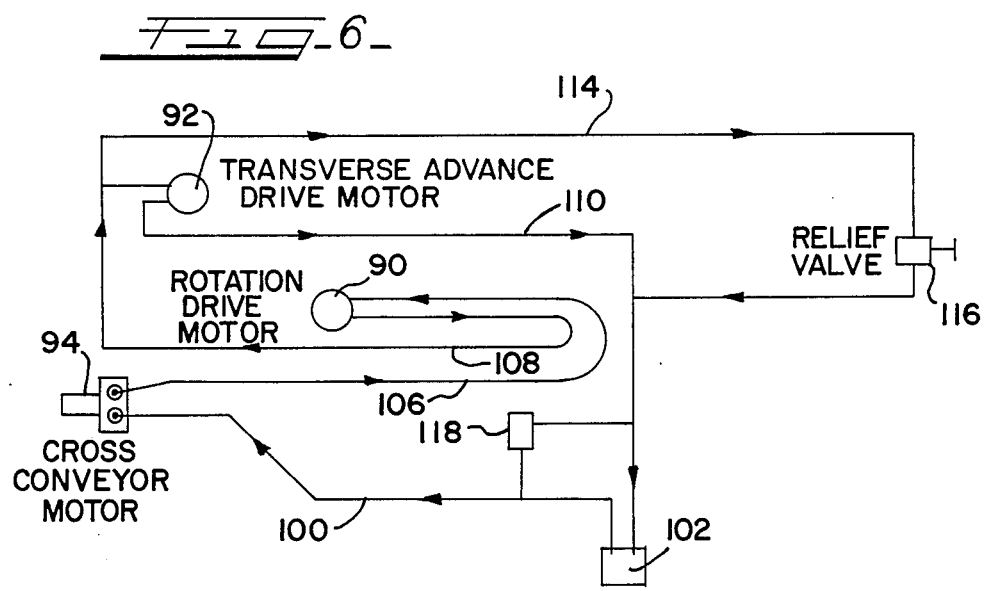
FIG. 6 is a schematic view of a preferred embodiment of hydraulic system.

Each of the aforementioned hydraulic drive motors 90, 92 and 94 are connected together by suitable hydraulic conduits, as best shown in FIGS. 3 and 6. Conduit 100 connects a control valve 102, which is stationarily mounted at the forward end of the forage box 10, with the inlet of the cross conveyor hydraulic motor 94. Control valve 102 is supplied via a suitable hydraulic power supply inlet conduit 104. Conduit 104 may receive its pressurized fluid from a hydraulic pressure source, for example from the tractor or other vehicle which is to be employed in transporting the forage box 10. The discharge from the cross conveyor hydraulic motor 94 passes through a conduit 106 to the rotation drive motor 90 on the carriage 31 for rotating the auger 24.

The fluid discharge from motor 90 passes through conduit 108 to the inlet of the transverse advance drive motor 92 for advancing the auger 24 transversely of the forage box. The discharge from the transverse advance drive motor 92 passes through conduit 110 back to the stationary control valve 102 from where it is discharged to the hydraulic power supply source through outlet conduit 112.

At least hydraulic conduits 106 and 108 are preferably flexible hoses so that they can slack as the carriage 31 and its hydraulic motor 90 move from the right to the left, as viewed in FIG. 3. The other conduits, such as conduit 100 between the control valve 102 and the stationarily positioned cross conveyor hydraulic motor 94 and conduit 110 which extends between the stationarily positioned transverse advance hydraulic drive motor 92 and the control valve 102, may be rigid metal conduits because they need not flex. Of course all of the conduits may be flexible hoses, if desired.

The hydraulic system of the transverse advance is well suited to sense and compensate for the varying resistance to the transverse advance movement of the auger 24 due to the material which is present in the forage box. When the forage box 10 is full, the transverse advance speed of the auger 24 will probably need to be slower than the speed when the box is almost empty. In order to alter this speed, a bypass conduit 114, as shown in FIG. 6, is provided which bypasses the hydraulic fluid from the inlet 108 of the transverse advance hydraulic drive motor 92 to a relief valve 116 and back to the transverse advance drive motor discharge 110. The relief valve 116 is preferably adjustable so that it can be adjusted to open when a predetermined pressure exists in the bypass conduit 114. Thereby, when the forage box is full, the auger 24 will experience resistance to its transverse advance movement causing the hydraulic fluid pressure to rise at the inlet of the transverse advance hydraulic drive motor 92 and in the bypass conduit 114. When this pressure reaches the setting of the relief valve 116, the relief valve will open to bypass some of the inlet fluid past the hydraulic drive motor 92, thereby slowing the motor and the speed of transverse advance of the auger 24. Accordingly, the bypass 114 and relief valve 116 senses this resistance to transverse movement and varies the speed of the auger advance accordingly.

A second relief valve 118, as shown in FIG. 6, is also preferably incorporated between conduits 100 and 110 to protect the hydraulic system against overpressure. If desired, relief valve 118 may be located in the stationary control valve 102.

Although it is believed from the foregoing description, that the operation of the preferred embodiment of unloading the system of the present invention will be evident, a brief description of the operation follows.

Description of Operation

The forage box 10 is filled in a conventional manner, for example in the field by a blower which blows the forage into the box over the top of the front wall 18 of the box. When the box 10 is filled and it is desired to bring the box from the field and discharge the forage for storage, such as in a silo, the forage box is positioned so that its discharge chute 88 may discharge to the silo blower B. At this time hydraulic fluid, for example from a hydraulic pump on the tractor which brought the box from the field, is admitted through inlet conduit 104 and control valve 102, the latter of which is opened, and through conduit 100 to the cross conveyor hydraulic motor 94. The cross conveyor hydraulic motor 94 rotates sprocket 96, as shown in FIG. 3, driving drive chain 98, as shown in FIG. 4, and the cross conveyor auger 86 so as to discharge material through opening 87 and discharge chute 88.

The hydraulic fluid discharged from the cross conveyor motor 94, as shown in FIGS. 3 and 6, passes through the hydraulic conduit 106 to the inlet of the main auger rotation hydraulic drive motor 90 causing the main auger 24 to rotate. Upon startup, the auger 24 will be positioned adjacent the sidewall 14 and beneath the cover 26, as shown in dot and dash in FIGS. 2 and 3, to prevent the weight of the load in the forage box from bearing directly upon the auger 24 upon startup.

The hydraulic fluid discharged from the auger rotation drive motor 90 passes through conduit 108 to the inlet of the hydraulic transverse advance drive motor 92. Rotation of the transverse advance drive motor 92 rotates the drive shaft 74. When drive shaft 74 rotates, as best seen in FIG. 4, the front and rear drive chains 76 and 82 will be driven to rotate shafts 78 and 84, respectively. Shaft 78 will cause sprocket 42 to rotate to drive the forward transverse advance chain 46. As chain 46 is driven, it will drive connector arm 48, which is pivotally pinned by pin 50 to a link of the chain and is also pivotally pinned by pin 52 to the front carriage 31, causing the front carriage to transverse back and forth on its rollers 34 on the horizontal track 36. Upon startup, the carriage 31 and its auger 24 will be located to the far left, as shown in dot and dash in FIG. 3, and during transverse advance the carriage will ultimately reach the position shown in solid in FIG. 3 before reversing itself.

The rotating drive shaft 74 also drives drive chain 82 at the rear of the forage box in sychronization with the forward drive chain 76. When drive chain 82 is driven, it will rotate shaft 84 and drive sprocket 62, as best seen in FIG. 5, to drive the rear transverse advance drive chain 66. Movement of drive chain 66 will cause the connector arm 68 to be driven, again because arm 68 is pivotally pinned by pin 70 to one of the links of the drive chain at one end and is pivotally attached by pin 72 to the rear transverse advance carriage 32. Thereby, movement of the connector arm 68 will cause the carriage 32 to move back and forth along the rear track 56 on rollers 54.

When the auger 24 is positioned beneath the cover 26, the cover will allow the auger to experience minimum resistance to transverse advance movement. Thus, transverse advance of the auger 24 will commence at maximum speed because all of the hydraulic fluid reaching the transverse advance drive motor 92 will pass through the motor and be discharged through conduit 110, control valve 102 and outlet conduit 112 back to the source of hydraulic supply.

As the auger 24 passes from under the cover 26, it will meet maximum resistance to transverse movement because it will begin to bite into the bottom of the material contained in the full forage box 10. When this resistance to movement is experienced, the pressure at the inlet of the transverse drive motor 92 will rise, as will the pressure in bypass conduit 114, shown in FIG. 6. When the pressure in conduit 114 rises to the level set on the relief valve 116, the relief valve will open to bypass hydraulic fluid around the transverse advance drive motor and return the fluid directly to the control valve 102 and outlet conduit 112 causing the motor 92 to slow and the speed of transverse advance to decrease. Thus, the rotating auger 24 will transversely advance only at a speed at which it is able to effectively bite into the material and deliver it toward the forward end of the auger 24 and the cross auger 86. As the material is discharged from the forage box 10 and the level of material drops, the resistance to transverse advance of the auger 24 will decrease steadily, such that when the forage box is almost empty, the speed of transverse advance will be at its maximum.

It will be seen from the foregoing description that the provision of the three separate hydraulic drive motors 90, 92 and 94 overcomes most, if not all of the disadvantages experienced by the prior art systems. The complex and hazardous beaters are eliminated, as well as the complex mechanical drives and power takeoffs which were necessary in the prior unloading systems. Elimination of these complex mechanical drives results in a substantial reduction in the size and weight of the system and its noise during operation, a substantial reduction in maintenance requirements, and a substantial improvement in the safety of the system in operation. Moreover, due to the reduction in mechanical drive components, the drive shaft 74 may also be positioned inside of the forage box 10 and beneath the cover 26, rather than outside of the forage box in an exposed location, thereby substantially enhancing the safety of the system and reducing the likelihood of damage or bending of the drive shaft 74. The use of augers 24 and 86 in place of chain conveyors also substantially reduces the noise and maintenance requirements and the likelihood of clogging, and eliminates the consequences of chain links in the forage in the event of breakage of the conveyor chains.

Although the drives have been described as hydraulic, it will be understood that they may be pneumatically operated without departing from the spirit and scope of the invention.

It will also be understood that the embodiment of the present invention which has been described is merely illustrative of one of the applications of the principles of the present invention. Numerous modifications may be made by those skilled in the art without departing from the true spirit and scope of the invention.

I claim:

1. A system for unloading material from a container, the container having a floor and a pair of substantially parallel sidewalls, said system comprising:
   an auger rotatable about an axis and extending in a direction substantially parallel to the sidewalls of the container;
   a first fluid motor on said auger for rotating said auger about the axis to convey material in the container toward one end of the auger;
   mounting means for mounting said auger to advance transversely across the floor of the container between the sidewalls, beneath the material in the container, and in a direction substantially perpendicular to the sidewalls;
   drive means including a second fluid motor for driving said mounting means to advance the auger transversely back and forth across the floor and adjacent the bottom of the material in the container while said auger is rotating;
   conduit means connecting the discharge of said first fluid motor to said second fluid motor;
   bypass conduit means communicating with said conduit means and bypassing said second fluid motor; and
   resistance sensing means, including relief valve means in said bypass conduit means, which senses the resistance to the transverse movement of the auger by the material in the container to bypass fluid by said second fluid motor in response to the resistance to vary the speed of the transverse movement of the auger across the floor of the container.

2. The system of claim 1, wherein said relief valve means controls the fluid pressure to said second fluid motor.

3. The system of claim 1, wherein said mounting means comprises track means extending transversely of said container, and carriage means movable along said track, an end of said auger being rotatably mounted on said carriage means.

4. The system of claim 3, wherein said track means includes a pair of tracks, one adjacent each end of said container, and said carriage means includes a pair of carriages, one on each of said tracks, said drive means driving both of said carriages along their respective tracks to advance said auger transversely.

5. The system of claim 4, wherein said drive means also includes a drive shaft which is rotatably driven by said second fluid motor, said drive shaft extending between said pair of carriages to drive said carriages in unison along their respective tracks.

6. The system of claim 1, including conveyor means in said container which extend transversely thereof and are positioned adjacent said one end of said auger to receive the material conveyed by said auger.

7. The system of claim 6, including a fluid motor for driving said conveyor means.

8. The system of claim 6, wherein said conveyor means is also an auger.

9. The system of claim 1, including cover means adjacent at least one of said sidewalls to prevent materials in said container from resting upon said auger when said auger is positioned adjacent said one of said sidewalls.

10. The system of claim 5, including cover means adjacent at least one of said sidewalls to prevent materials in said container from resting upon said auger when said auger is positioned adjacent said one of said sidewalls, said drive shaft also extending beneath said cover means.

11. The system of claim 1, including conveyor means in said container which extends transversely thereof and is positioned adjacent said one end of said auger to receive the material conveyed by said auger, a third fluid motor for driving said conveyor means, and conduit means connecting the discharge of said third fluid motor to said first fluid motor.

12. The system of claim 11, wherein said conveyor means also comprises an auger.

13. The system of claim 1, wherein said container is a portable forage box.

14. The system of claim 6, wherein said container is a portable forage box.

15. The system of claim 10, wherein said container is a portable forage box.

16. The system of claim 11, wherein said container is a portable forage box.

* * * * *